(No Model.)
J. O'CONNOR & C. A. TURNER.
ALARM FOR WATER CONTAINING VESSELS.
No. 598,572. Patented Feb. 8, 1898.
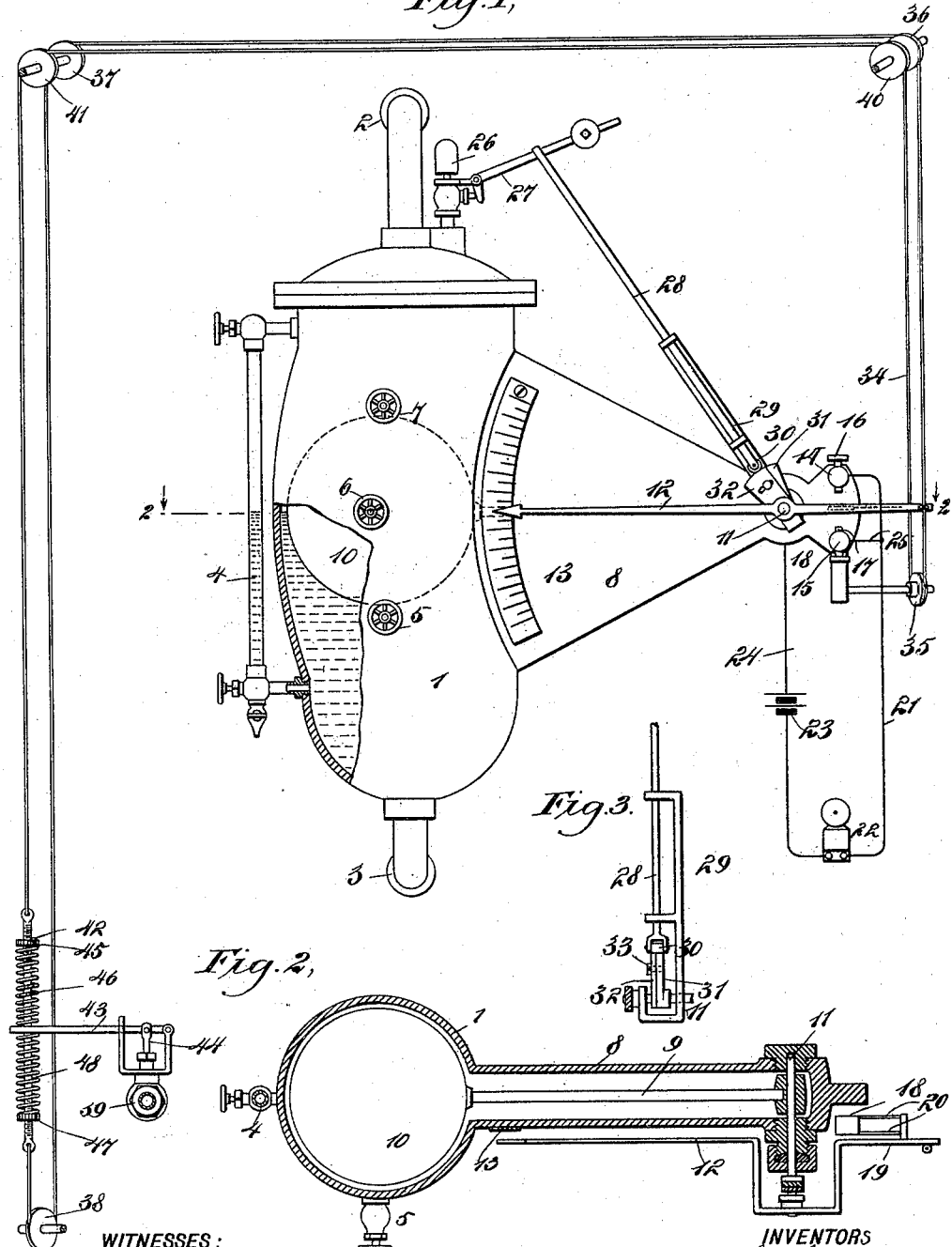
WITNESSES:
Edward Thorpe.
C. R. Ferguson
INVENTORS
J. O'Connor.
C. A. Turner.
BY
ATTORNEYS.

UNITED STATES PATENT OFFICE.

JOHN O'CONNOR AND COLLATINUS A. TURNER, OF NEW YORK, N. Y.

ALARM FOR WATER-CONTAINING VESSELS.

SPECIFICATION forming part of Letters Patent No. 598,572, dated February 8, 1898.

Application filed April 15, 1897. Serial No. 632,252. (No model.)

*To all whom it may concern:*

Be it known that we, JOHN O'CONNOR and COLLATINUS A. TURNER, of New York city, in the county and State of New York, have invented a new and Improved Alarm for Water-Containing Vessels, of which the following is a full, clear, and exact description.

This invention relates to mechanism for giving an alarm when the water in a vessel—such, for instance, as a steam-boiler—rises or falls beyond certain desired levels; and the object is to provide a device of this character of comparatively cheap construction and of few parts not likely to get out of order and which will be positive in its action.

We will describe an alarm for water-containing vessels embodying our invention and then point out the novel features in the appended claims.

Reference is to be had to the accompanying drawings, forming a part of this specification, in which similar characters of reference indicate corresponding parts in all the views.

Figure 1 is a partial elevation and partial section of a device embodying our invention. Fig. 2 is a section on the line 2 2 of Fig. 1, and Fig. 3 is an elevation of a portion of a valve-operating device for a steam-whistle.

The alarm comprises a water-cylinder 1, designed to have a pipe connection 2 with the upper portion of a water vessel and a pipe connection 3 with the lower portion of said vessel. The cylinder 1 is provided with a water-gage 4, and it is also provided with three outlet-valves 5, 6, and 7. By connecting the cylinder with the top and bottom of a vessel—such, for instance, as a steam-boiler—it is obvious that the water contained in the cylinder will maintain a level with that in the boiler.

Extended outward from the cylinder 1 and having communication therewith is a casing 8, through which the stem portion 9 of a float 10 passes, the float 10 being arranged in the cylinder 1 to be operated upon by the water in the cylinder. The stem 9 of the float is secured to a shaft 11, extended transversely through the outer end of the casing 8, and an outwardly-extended portion of this shaft 11 has connection with a pointer 12, the end of which will move over a gage-plate 13, secured to the outer surface of the casing 8. This gage-plate 13 has marks upon it to indicate the depth of water that may be in the cylinder, but it is obvious that these marks may be placed directly upon the casing. This indicator, comprising the parts 12 and 13, will be useful should the water-gage be rendered inoperative from any cause.

Binding-posts 14 and 15 are secured near the end of the casing 8, and adjustable contact-points (here shown as screws 16 and 17) extend through these binding-posts. The contact-points 16 and 17 are in the line of movement of a spring yielding contact-plate 18, carried by an outwardly-extended portion 19 of the pointer 12. The contact-plate 18 is mounted on fine spring-wires 20, attached at one end to a pin extended from the portion 19 of the pointer.

From the contact-point 16 a wire 21 extends to an alarm (here shown as a bell 22) and thence to a battery 23. From the other pole of this battery a wire 24 extends to electrical connection with the casing 8 and consequently is in electrical connection with the pointer 12 and the contact-plate 18. By this construction when the float 10 falls sufficiently by the lowering of the water in the boiler and the cylinder 1 the contact-plate 18 will engage with the contact-point 17 and close the circuit through the battery 23 and sound the alarm 22. Should the water rise too high in the boiler, the float will be carried upward to cause the contact-plate 18 to engage with the contact-point 16, and consequently the alarm 22 will be sounded at this time.

It may be desired to sound an alarm in the form of a whistle when the water reaches too high or too low a point, and therefore we have constructed a device to sound such an alarm. A whistle 26 has connection with the interior of the cylinder 1, and the valve of this whistle is engaged by a pivoted lever 27. From the lever 27 a rod 28 extends downward through guides on the guide-plate 29, mounted to swing on the shaft 11, and this rod at its lower end has a roller 30 bearing normally on the curved ends of supporting-plates 31 and 32, mounted on the shaft 11. These plates are adjustable one relatively to the other, so that the length of bearing-space for the roller 30 may be adjusted as desired, depending upon the level of water desired in the boiler. As here shown, the plate 31 is adjustably attached to the shaft 11 and is to be held rigidly as adjusted by a set-screw, but the plate 32 is mounted to swing on said shaft. The plate 32 is provided with a transverse slot, through which a set-bolt 33 extends into a tapped hole in the plate 31. By means of this set-bolt 33 the plates may be rigidly secured together as adjusted.

It is further desired by the upward and downward motion of the float to control a water-supply to a boiler or other vessel. We have here shown the outwardly-extended portion 19 of the pointer 12 connected to one run of a rope or wire 34. The rope 34 extends around a pulley 35, supported from the casing 8, and one run of this rope extends over overhead pulleys 36 and 37 and thence around a pulley 38, arranged below a controlling-valve 39, which may be the controlling-valve in a pipe for water under pressure or may be the valve of a steam-pump. The other run of the rope extends over overhead pulleys 40 and 41, and the two ends of the rope are connected to the ends of a metal rod 42, which extends loosely through a lever 43, fulcrumed on a bracket extended from the casing of the valve 39 and having pivotal connection with the stem 44 of said valve. At its upper end the rod 42 is screw-threaded, and this screw-thread is engaged by an interiorly-threaded collar 45, which forms an abutment for the upper end of a spring 46, the lower end of said spring bearing on the upper side of the lever 43. The lower end of the rod 42 is also screw-threaded and engaged by an interiorly-screw-threaded nut or collar 47, forming an abutment for the lower end of a spring 48, the upper end of which bears against the under side of the lever 43. The object of these springs 46 is to provide a yielding connection between the rope 34 and the lever 43, so that in case of failure to operate the valve the float 10 may still travel a sufficient distance to operate the alarm, and the object of making the collars or abutments 45 and 47 adjustable on the rod 42 is to adjust the springs to or from the valve-lever as may be desired for the required water-level. The object in mounting the contact-plate 18 on the resilient wires is to allow a still farther movement in either its upward or downward direction of the float 10 while electrical contact is made, thus allowing the rope 34 to be moved sufficiently to open or close the valve 39.

In the operation of the whistle-alarm should the water became too low in the cylinder 1 the float will of course fall to the level of the water, and as the plates 31 and 32 are attached to the shaft 11, which is rotated by the movement of the float, the said plates will be moved out of line with the roller on the end of the rod 28, thus allowing the weight on the valve-lever 27 to rock said valve-lever downward and open the whistle-valve. When the float moves downward to its lowest level, the rope 34 will be moved over the pulleys in the direction to move the lever 43 upward and consequently open the valve 39, and as the water controlled by said valve 39 rises in the boiler and the cylinder 1 the float will also rise and while moving will draw downward upon the rope 34, and when the float shall have reached its highest level the rope will be sufficiently moved to operate the lever 43 to close the valve 39, thus cutting off the steam-inlet to the pump that may be controlled by said valve or cutting off a water-pipe controlled by said valve.

It is obvious that two alarms—such, for instance, as the electric alarm and the steam-whistle alarm—need not be used together in connection with our invention; but this may be desirable in case an engineer should find it necessary to be at such a distance from his engine that the electric alarm would not be audible to him but the whistle could be plainly heard.

Having thus described our invention, we claim as new and desire to secure by Letters Patent—

1. An alarm device for high and low water, comprising a cylinder for attachment to a water vessel, a casing extended from said cylinder, a float in the cylinder, a stem extended from said float, a shaft extended transversely of the casing and to which said stem is rigidly attached, an electric circuit comprising an alarm, contact-points mounted on the casing and having connection with the electric circuit, an arm mounted on the shaft extended through the casing, a contact-plate carried by said arm for engagement with the contact-points, and a spring yielding connection between said arm and a valve, for opening and closing said valve by the vertical movement of the float, substantially as specified.

2. An alarm device for high and low water, comprising a cylinder, a float in said cylinder, a casing extended from the cylinder, a stem extended from the float and engaging with a shaft extended transversely of the casing, an electric circuit comprising an alarm, contact-points on the casing in connection with said electric circuit, an arm extended from the shaft and carrying a contact-plate for engagement with the contact-points, a rope or wire connected to said arm and extended around pulleys, a controlling-valve, a lever extended from the stem of the controlling-valve, a rod connected to the rope or wire and extended loosely through an opening in said lever, adjustable collars on said rod above and below the lever, and springs between said collars and the lever, substantially as specified.

3. An alarm device for high and low water, comprising a cylinder having a casing extended from it, a float operating in the cylinder, a stem extended from said float and having a rigid connection with a shaft extended transversely of the cylinder, an arm attached to the outer end of said shaft, an electric circuit comprising an alarm, means carried by the arm for engaging with contact-points connected with the electric circuit upon either the rise or fall of the float, a steam-whistle on the cylinder, a lever connected to the casing thereof and bearing upon the valve-stem, a rod extended from said lever through a guide secured to the casing, and plates mounted on a shaft and adjustable one relatively to the other, upon the ends of which the lower portion of the rod extended from the whistle-valve lever engages, substantially as specified.

4. An alarm device for high and low water, comprising a cylinder having a casing extended from it, a water-gage on said cylinder, a float movable in the cylinder, a stem extended from the float and connecting with a shaft extended transversely of the cylinder, an arm carried by the outer end of said shaft, a yielding contact-plate attached to said arm, an electric circuit comprising an alarm, adjustable contact-points on the casing and in connection with the electric circuit, and a spring yielding connection between said arm and a water-controlling valve, for operating said water-controlling valve by an upward or downward movement of the float, substantially as specified.

JOHN O'CONNOR.
COLLATINUS A. TURNER.

Witnesses:
J. FRED. ACKER,
EVERARD BOLTON MARSHALL.